United States Patent
Bello et al.

(10) Patent No.: US 6,507,883 B1
(45) Date of Patent: Jan. 14, 2003

(54) RECALLING LOGICAL VOLUMES TO CACHE FROM PHYSICAL MEDIA VOLUMES FOR REDUNDANT STORAGE IN AUTOMATED DATA STORAGE LIBRARIES

(75) Inventors: Keith Anthony Bello, Oro Valley, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 09/693,952

(22) Filed: Oct. 23, 2000

(51) Int. Cl.[7] .............................................. G06F 12/00
(52) U.S. Cl. ............................ 711/4; 711/111; 711/112; 707/204
(58) Field of Search ............................ 711/117, 111, 4, 711/112, 113, 114; 707/202, 204

(56) References Cited

U.S. PATENT DOCUMENTS

| | | | |
|---|---|---|---|
| 4,771,375 A | 9/1988 | Beglin et al. | 711/111 |
| 5,644,766 A | 7/1997 | Coy et al. | 707/204 |
| 5,819,310 A | 10/1998 | Vishlitzky et al. | 711/114 |
| 5,845,316 A | 12/1998 | Hillyer et al. | 711/111 |
| 6,029,179 A | 2/2000 | Kishi | 707/202 |

*Primary Examiner*—Do Hyun Yoo
*Assistant Examiner*—Nasser Moazzami
(74) *Attorney, Agent, or Firm*—John H. Holcombe

(57) ABSTRACT

An automated data storage library stores logical volumes, including logical volumes to be copied to a second library, in cache storage, and migrates logical volumes to physical media volumes stored on storage shelves. In response to a request for recalling one of the logical volumes to be copied to cache, a library controller first determines which physical media volume contains the requested migrated logical volume. The library controller identifies all of the logical volumes to be copied that are migrated and stored as stacked logical volumes on the physical media volume containing the requested migrated logical volume; selects up to "N" of the identified logical volumes, including the requested migrated logical volume; and may arrange a selection list of the selected logical volumes in a sequence in accordance with the order that the logical volumes are written on the physical media volume. The selected logical volumes are then recalled to cache storage, and a list of the recalled logical volumes is provided in response to the recall request.

24 Claims, 6 Drawing Sheets

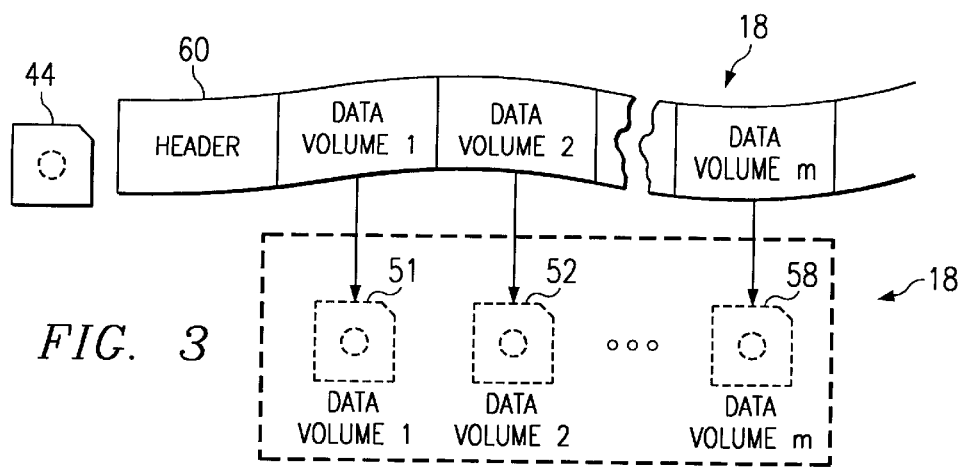
FIG. 3
FIG. 4
FIG. 5
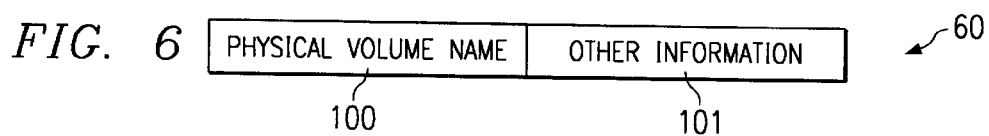
FIG. 6

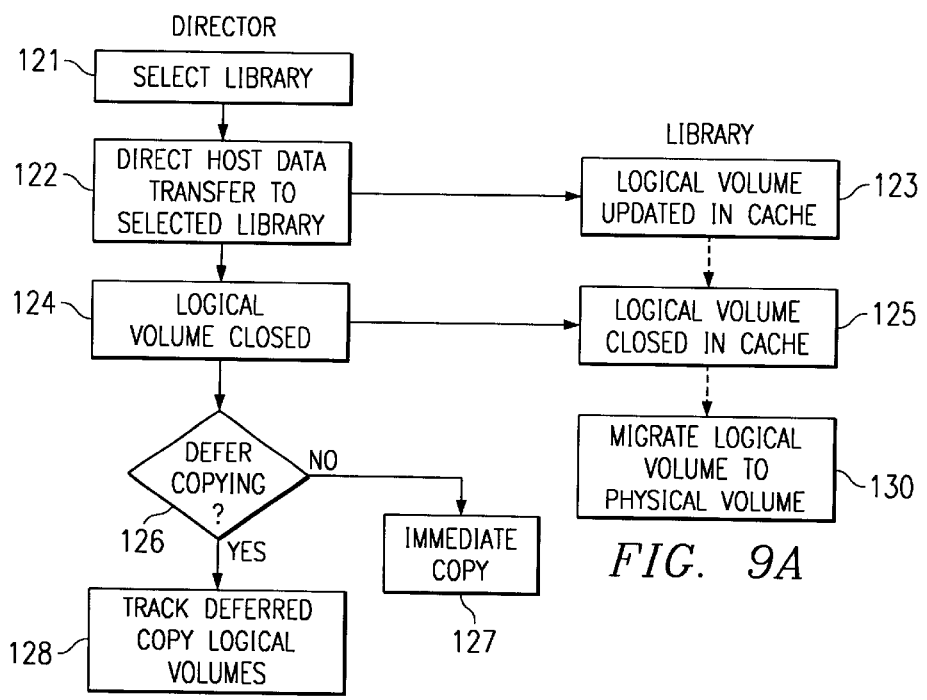

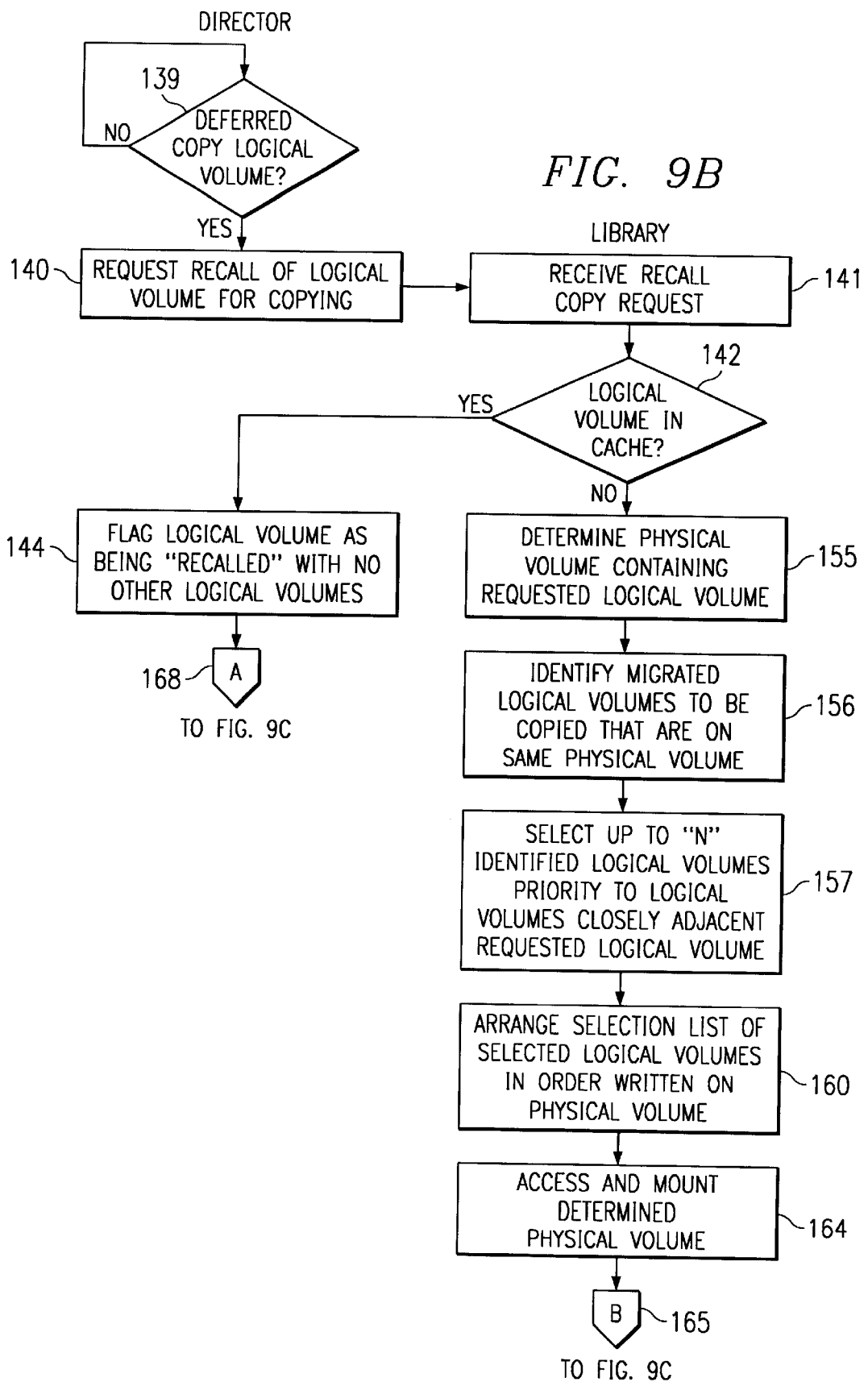

RECALLING LOGICAL VOLUMES TO CACHE FROM PHYSICAL MEDIA VOLUMES FOR REDUNDANT STORAGE IN AUTOMATED DATA STORAGE LIBRARIES

FIELD OF THE INVENTION

This invention relates to redundant storage of data in the form of logical volumes in a plurality of automated data storage libraries, and, more particularly, to the recall of logical volumes to cache from physical media volumes in a library, where the logical volumes are to be copied into another library for redundant storage.

BACKGROUND OF THE INVENTION

Data processing systems typically require large amounts of data storage capacity, some of which is needed quickly and may be stored in memory and hard disk drives, and other of which is not immediately required. As an example, data not immediately required may comprise data that is infrequently accessed, and the storage of the data may be in the form of logical volumes of data stored on removable rewritable physical media volumes, such as magnetic tape or optical disk, and the physical media volumes may be written and/or read by means of a data storage drive.

If large amounts of data are to be stored and then accessed on occasion, automated data storage libraries are often employed. Such libraries provide efficient access to large quantities of data stored on physical media volumes which are stored in storage shelves and which are accessed by one or more accessors and delivered to data storage drives in the library.

It is desirable to provide a level of redundancy of the stored data to provide constant availability of access to the data, even should an automated data storage library or a communication path to an automated data storage library become unavailable. An example of a data storage library system for redundantly storing and accessing data stored as logical volumes on physical media volumes in a plurality of automated data storage libraries is the IBM Magstar Peer-to-Peer Virtual Tape Server, which comprises a plurality of directors, such as "AX0" Virtual Tape Controllers, and at least two automated data storage libraries, such as 3494 Magstar Virtual Tape Servers.

A request by a host data processing system to create or modify a logical volume is steered by a director to one of the libraries. If the request requires access to a physical media volume that contains the requested logical volume, the library accesses the physical media volume from its storage shelf, and mounts the physical media volume at a desired data storage drive. The logical volume is read to cache storage, which may comprise hard disk drives or other high speed storage, so that it may be immediately accessed and provided to the host system. If the request is for a logical volume that is already in cache, or is for a logical volume that will be completely rewritten (scratch mount), a physical media volume access is not required. The host system then reads from or writes to the logical volume in the cache, via a director. When the host system closes the logical volume, the logical volume remains in cache storage so that it can be immediately reaccessed. If the logical volume was updated, the directors will typically immediately re-access the logical volume from the cache storage of one library and copy it to the other library so that both libraries have the most current copy.

The cache storage is typically limited in capacity, requiring that the updated logical volumes be migrated to backing storage, comprising the physical media volumes, so as to free space in the cache storage. Typically, a least recently used (LRU) algorithm is employed to migrate logical volumes out of cache storage to backing storage. Preferably, migration of a logical volume occurs subsequent to the re-access and copying of the logical volume to the other library.

Should one of the libraries become temporarily unavailable or the communication path from the directors to the library become temporarily unavailable, for example, because of a service action, the remaining library will continue to provide logical volumes and to accumulate updated logical volumes, without an opportunity to immediately copy an updated logical volume to the other library. Thus, the copying is deferred to a point when the other library again becomes available. Alternatively, a customer may select a deferred copy mode in order to provide higher peak host system input/output performance.

Should the deferred copy mode continue for an extended period of time, for example, several hours, many of the logical volumes which are to be copied must be migrated to backing storage so as to free space in the cache storage.

Recalling and copying a migrated logical volume requires that the physical media volume containing the migrated logical volume be mounted on a data storage drive, so that the logical volume may be recalled into cache storage, re-accessed and copied. Mounting a physical media volume is so time consuming that it may be difficult, or impossible, to catch up the copying of all logical volumes whose copying has been deferred.

SUMMARY OF THE INVENTION

An object-of the present invention is to increase the efficiency of the recall and copying of migrated logical volumes.

An automated data storage library, multiple library system, method, and computer program product are provided for recalling logical volumes of data stored by an automated data storage library in response to a request to copy a logical volume that has been migrated, the request received, for example, from one of a plurality of directors. Each automated data storage library stores logical volumes, including logical volumes to be copied to a second automated data storage library, and the copy request for a migrated volume requires recalling the logical volume to be copied. Hence, herein, the terms, "copy request", "recall", "recall request", etc., are used interchangeably.

The library comprises a plurality of storage shelves for storing physical media volumes, wherein the physical media volumes are each capable of storing a stacked plurality of the logical volumes. At least one data storage drive is provided for reading and/or writing the stacked logical volumes of the physical media volumes, and at least one accessor is provided for transporting the physical media volumes amongst the storage shelves and the data storage drives and for mounting and demounting the physical media volumes at the data storage drives. A cache storage is provided for storing a subset of the logical volumes, and a library controller is provided for operating the library in accordance with the present invention, including the migration of logical volumes from the cache storage to the physical media volumes as stacked logical volumes, to free up space in cache storage.

In accordance with the present invention, the library controller responds to a recall of a logical volume to be copied, which logical volume has been-migrated to the physical media volumes, by first determining which physical media volume contains the requested migrated logical volume. The library controller also identifies all of the logical volumes that need to be copied, in addition to the requested migrated logical volume, that are migrated and stored as stacked logical volumes on the determined physical media volume containing the requested migrated logical volume. The library controller then selects up to "N" of the identified logical volumes, including the requested migrated logical volume, and arranges a selection list of the selected logical volumes optionally, the list of selected logical volumes is arranged in a sequence in accordance with the order that the selected logical volumes are written on the determined physical media volume. The library controller employs the accessor to transport and mount the determined physical media volume to a data storage drive, recalling the selected logical volumes of the mounted physical media volume, via the data storage drive, to the cache storage in accordance with the selection list. Then, in response to the recall request, the library controller provides a list of the recalled selected logical volumes to one, or a plurality of, directors.

The library controller optionally gives priority to the identified logical volumes most closely adjacent the requested migrated logical volume in selecting the up to "N" identified logical volumes. In this manner, the logical volumes best comprising a closely positioned sequence are recalled together at one time, saving substantial accessing time.

For a fuller understanding of the present invention, reference should be made to the following detailed description taken in conjunction with the accompanying drawings.

BRIEF DESCRIPTION OF THE DRAWINGS

FIG. 3 is a generalized diagram of stacked logical volumes stored on a single physical media volume for use in an automated data storage library of FIGS. 1 and 2;

FIG. 4 is a diagrammatic representation of a table employed by directors of FIG. 1 for identifying logical volumes to be copied from one library to another for redundant storage of the data;

FIG. 5 is a diagrammatic representation of a table employed by libraries of FIGS. 1 and 2 in accordance with an embodiment of the present invention for tracking logical volumes stored in the library;

FIG. 6 is a diagrammatic representation of a header of a physical media volume which comprises an identification of the physical media volume;

FIG. 7 is a diagrammatic representation of a list of logical volumes of a physical media volume selected by a library of FIGS. 1 and 2 in accordance with an embodiment of the present invention;

FIG. 8 is a diagrammatic representation of a list of logical volumes recalled to cache by a library of FIGS. 1 and 2 in accordance with an embodiment of the present invention;

FIGS. 9A, 9B and 9C are flow charts depicting the method of the present invention;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
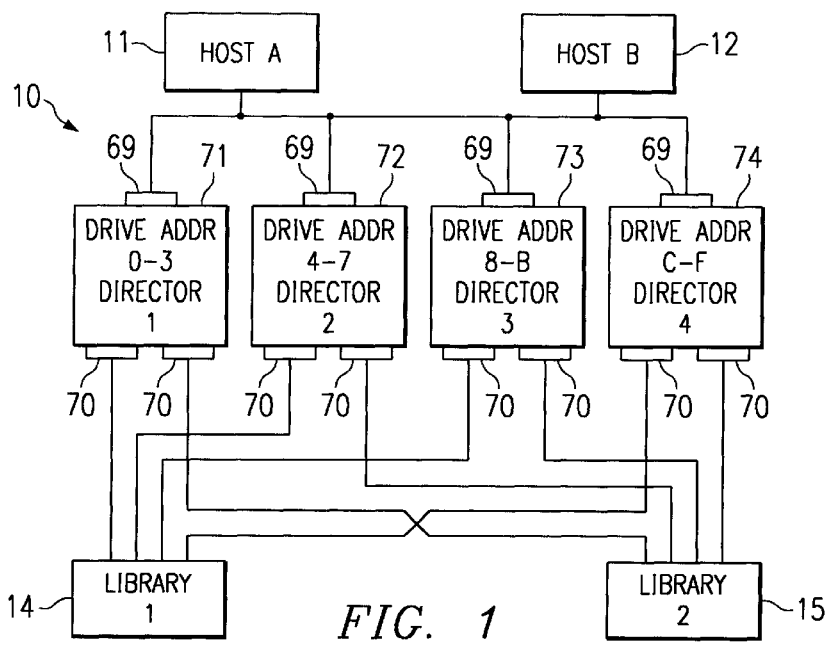
FIG. 1 is a block diagram showing functional components of a data storage library system for redundantly storing and accessing logical volumes of data, and their interconnection, which are employed to implement an embodiment of the present invention.

Referring to FIG. 1, an example of a data storage library system 10 is illustrated which redundantly couples host systems 11 and 12 to automated data storage libraries 14 and 15, via a plurality of directors 71–74, and which redundantly stores and accesses data stored as logical volumes on physical media volumes at both libraries. The host systems 11 and 12 may be embodied by a variety of types and numbers of processing units, servers, or computing systems. An example of a data storage library system for redundantly storing and accessing copies of logical volumes of data in a plurality of automated data storage libraries is the IBM Magstar Peer-to-Peer Virtual Tape Server, which comprises a plurality of directors, such as AX0 Virtual Tape Controllers, and at least two automated data storage libraries, such as 3494 Magstar Virtual Tape Servers. In the IBM Magstar Peer-to-Peer Virtual Tape Server, the redundant copies of the logical volumes are tracked by means of synchronization tokens directly associated with each logical volume and maintained by each library.

Figure 2:
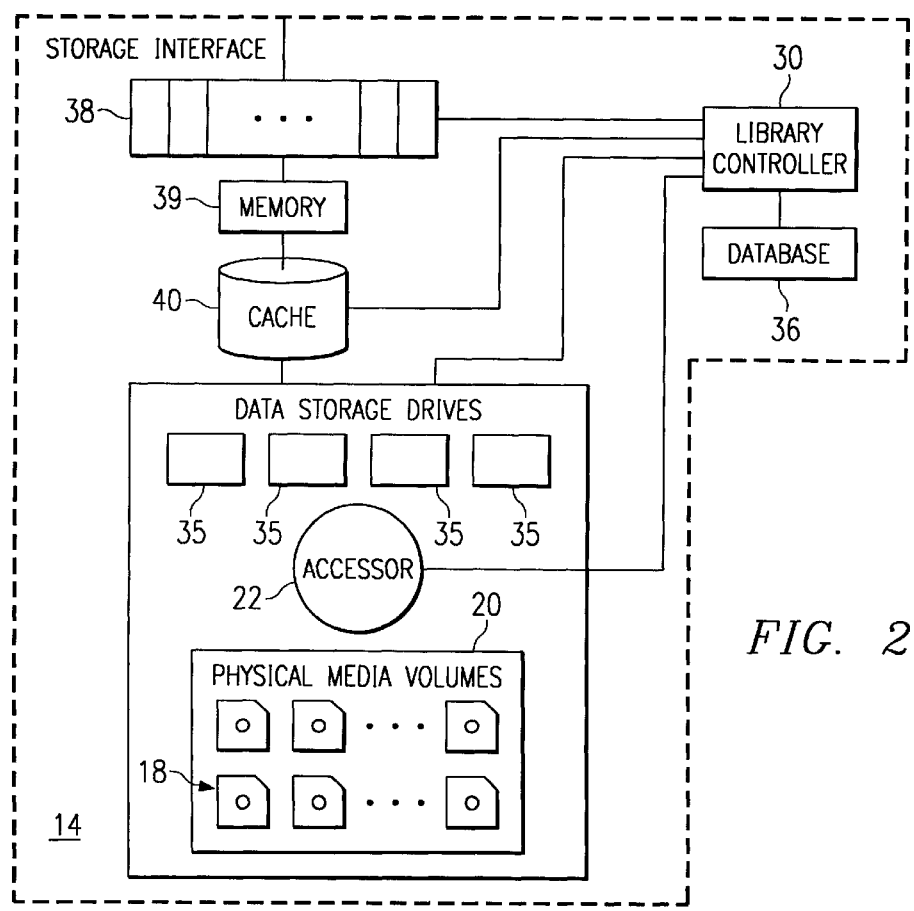
FIG. 2 is a block diagram showing functional components of an example of an automated data storage library of FIG. 1, employed in accordance with an embodiment of the present invention.

Each director 71–74 communicates with a host over an interface 69 and with a library 14 or 15 over an interface 70. The host systems 11 and 12 are coupled to and employ the data storage library system 10 for storing data, typically in the form of logical volumes, many of which are not immediately required by the hosts, for example, if their data is infrequently accessed. Referring additionally to FIG. 2, the data is typically stored as logical volumes on physical media volumes 18, and the physical media volumes are stored in storage shelves 20 which are accessed by at least one accessor 22 under the control of a library controller 30. The physical media volumes comprise removable rewritable data storage media, such as magnetic tape cartridges or optical disks. A plurality of data storage drives 35 are provided to read and/or write the data on the physical media volumes. The data storage library may comprise a "virtual" library, that may appear as multiple virtual data storage drives to the hosts, and in which the virtual data storage drives are coupled with non-volatile cache storage, such as one or more disk drives 40, or an electronic memory 39 with non-volatile capability, such as a "flash" memory, or memory with a battery for back up power.

The library controller 30 may comprise a library manager which utilizes a data base 36 to track each logical volume and the physical media volume 18 on which it is stored, to track the storage shelf location 20 of each physical media volume, and to track each logical volume in cache storage 39, 40. The data base 36 and cache storage 40 may comprise the same or different magnetic disk drives. The library controller may comprise one or a plurality of programmable computer processors which are operated by one or more operating systems and one or more application programs for operating in accordance with the present invention. The application programs may comprise a computer program product, having computer readable program code. The computer program product may be supplied electronically, as from a network of one of the hosts 11, 12 at communications interface 38, via a director. Alternatively, the computer program product may be supplied at an I/O station of the processor or from a storage media which stores executable computer instructions, and comprises an article of manufacture, such as data storage media 18 in FIG. 3. Another example of a storage media which is an article of manufacture is a magnetic diskette. Other suitable storage media are optical disks, removable hard disk cartridges, read only memories (ROM) or programmable read only memories (PROM). The requirement for the storage media or memories is that they store digital representations of computer executable instructions. The operating systems and application programs may be stored in the data base 36 or in other memory of the library controller 30.

Communication with the library is conducted at a storage interface 38 to the library controller 30, cache storage 39, 40 and to addressed data storage drives 35.

FIG. 3 is a schematic representation of a physical media volume 18, such as a magnetic tape in a cartridge 44, which contains "M" logical volumes 51–58. The storage of multiple logical volumes of data in a single physical media volume is called "volume stacking". In one configuration, a single physical media volume can include up to 140 logical volumes of 50 MB each, each of which can be individually addressed and accessed. In another configuration, a single physical media volume can include a variable number of logical volumes of variable size, each of which can be individually addressed and accessed. Typically, the physical media volume 18 has a header 60 which identifies the physical media volume.

Referring to FIGS. 1 and 2, a request for a logical volume from a host system 11, 12 is steered by a director 71–74 to one of the libraries 14, 15, which accesses the physical media volume 18 that contains the requested logical volume from its storage shelf 20 and mounts the physical media volume at a desired data storage drive 35. The logical volume is read to cache storage 39, 40, so that it may be immediately accessed and provided to the host system. Although data stored in an automated data storage library is infrequently accessed, when data is required by a host, the logical volumes may be accessed numerous times and continually updated. Thus, logical volumes that have been recently accessed are typically maintained in cache storage 39, 40 of the library from which it was accessed.

The cache storage 39, 40 is typically limited in capacity, requiring that the logical volumes be migrated to backing storage, comprising the physical media volumes 18, so as to free space in the cache storage. Typically, a least recently used (LRU) algorithm is employed to migrate logical volumes out of cache storage to backing storage.

If a logical volume is modified, then, when the updating of a logical volume is complete, the logical volume is closed by a host, via a director 71–74, on one of the libraries 14, 15 and the logical volume is initially stored in its cache storage 39, 40, and its synchronization token is updated. The logical volume must then be copied from the one library to another library. The directors will therefore typically immediately re-access the logical volume in the cache storage of one library and copy it to the other library so that both libraries have the most current copy.

However, should one of the libraries 14, 15 become temporarily unavailable or the communication path from the directors 71–74 to the library become temporarily unavailable, for example, because of a service action, the remaining library will continue to provide logical volumes and accumulate updated logical volumes, but without an opportunity to immediately copy an updated logical volume to the other library. Thus, the copying is deferred to a point when the other library again becomes available. Alternatively, a customer may select a deferred copy mode in order to provide higher peak host system input/output performance.

If the outage or deferred copy mode continues for an extended period of time, such as several hours, the migration of a logical volume occurs prior to the re-access and copying of the logical volume to the other library.

FIG. 4 illustrates a director copy list, which may be implemented as a table 80, that is employed by each of the directors 71–74 of FIG. 1 for identifying logical volumes to be copied from one library to another for redundant storage of the data. In the example of FIG. 80, each logical volume is identified in column 81 by its volume serial number, or VOLSER, comprising a predetermined number of characters or blanks. The VOLSER is employed in various lists and tables as well as the index 60 of the physical media volume 18 of FIG. 3. The director copy list 80 also comprises an identification of the library storing the most current copy of the logical volume in column 82, and a flag 83 indicating whether the copying of the logical volume has been deferred.

FIG. 5 illustrates a logical volume table 90 which may be employed by libraries 14, 15 of FIGS. 1 and 2 in accordance with an embodiment of the present invention for tracking all of the logical volumes stored in the library, which are identified by means of their VOLSERs 91. A cache flag 92 is provided which indicates whether the logical volume is currently in cache. A version of the logical volume may also be present in a physical media volume 18, but the logical volume in cache storage 39, 40 will be the most current. The physical media volume containing the logical volume is identified in column 93. Most physical media volumes also have a VOLSER, or a similar identifier which is translatable to a VOLSER, encoded in a label which is on the side of the cartridge which is readable by the library, and this is the identifier employed in column 93. The location of the logical volume on the physical media volume is provided in column 94. In accordance with the present invention, a flag or similar identifier 96 is employed to identify whether the logical volume is to be copied to another library in order to redundantly store the logical volume. A flag may be provided in column 97 which indicates whether the logical volume has been recalled, as will be explained hereinafter.

FIG. 6 illustrates a header 60 of a physical media volume 18 of FIG. 3, identifying the physical media volume, e.g., by the VOLSER 100 of the physical media volume. The header may also comprise other information 101, such as an identification of the format of the volume.

Briefly, the present invention is intended to increase the efficiency of the recall and copying of migrated logical volumes. A logical volume is indicated as migrated by the absence of a cache flag 92 in the table of FIG. 5. If the logical volume has been migrated, a director will provide a recall request. The library controller responds to a recall request of a logical volume to be copied, which logical volume has been migrated to the physical media volumes, by first determining, e.g., employing table 90 of FIG. 5, which physical media volume 93 contains the requested migrated logical volume. The library controller identifies all of the logical volumes to be copied 96, in addition to the requested migrated logical volume, that are migrated 92 and stored as stacked logical volumes on the determined physical media volume 93 containing the requested migrated logical volume.

Referring additionally to FIG. 7, the library controller then selects up to "N" of the identified logical-volumes, including the requested migrated logical volume, and provides a selection list 105 of the selected logical volumes, preferably arranged in a sequence in accordance with the order that the selected logical volumes are written on the determined physical media volume. The example of the selection list comprises the logical volumes identified by VOLSER 106, and identifies the location 107 of the logical volume on the physical media volume. The sequential arrangement of the physical media volumes either may be by physically arranging the listed volumes in sequence, or may employ a sequence number 108 as a pointer for each logical volume. The library controller employs the accessor to transport and mount the determined physical media volume to a data storage drive, and recalls the selected logical volumes of the mounted physical media volume, via the data storage drive, to the cache storage in accordance with the selection list.

Referring to FIG. 8, in response to the recall request, the library controller provides a list 110 of the recalled selected logical volumes. The logical volumes are identified by VOLSER 111, and the location 112 of the logical volume in cache storage may be provided, as well as the recall status (success or failure) 114 of the logical volume.

Figure 9C:
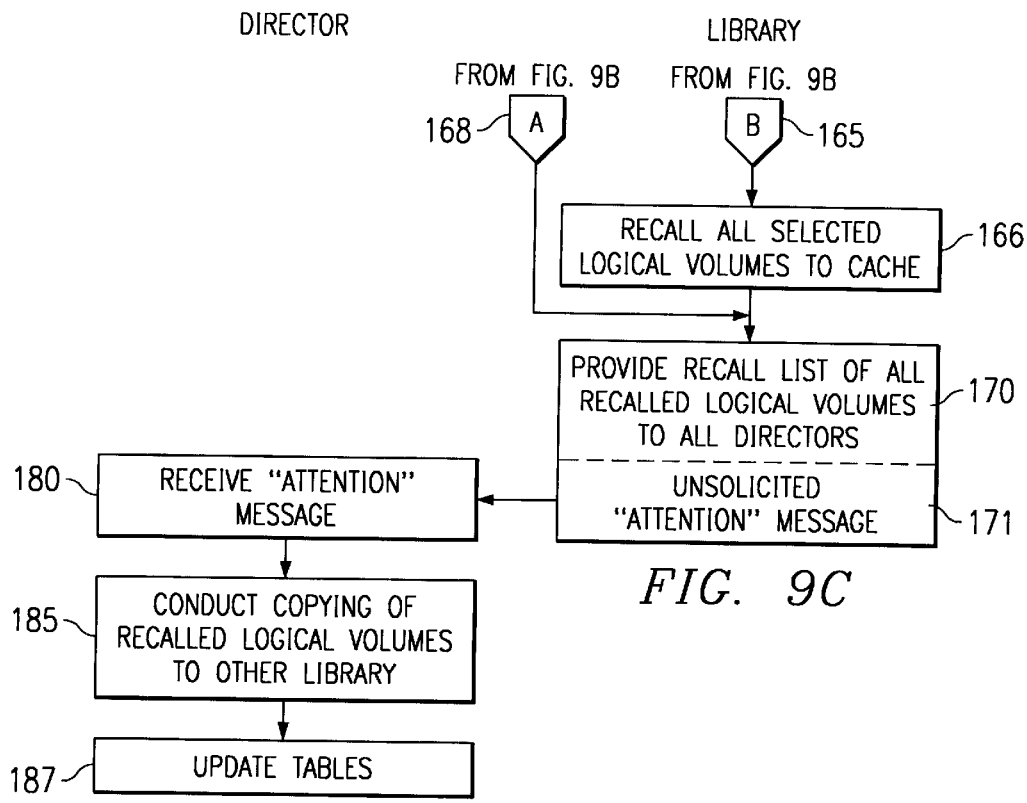

Referring to FIGS. 9A, 9B and 9C, and additionally to FIGS. 1 and 2, in step 121, the director 71–74 handling a data transfer of a host system 11, 12 selects one of the automated data storage libraries 14, 15, and directs the data transfer to the selected library in step 122. When the host system updates a logical volume, the library controller 30 of the selected library 14, 15, in step 123, updates the logical volume in cache storage 39, 40 for re-access by the host system. When the host system, in step 124, closes the logical volume, the logical volume is also closed in cache in step 125 for potential immediate re-access and copying to the other library. In step 125, the library enters the logical volume in the logical volume table 90 of FIG. 5, setting the cache flag 92 and the copying required flag 96.

The director 71–74, in step 126, determines whether the redundant copy is to be made immediately in step 127, or deferred. If the copy process is immediate, when the logical volume is closed by a host, the director ensures that a copy has been made to another library before the logical volume "close" processing is complete. If the copy process is to be deferred, in step 128, the logical volume is entered in the director copy list 80 of FIG. 4, in order to track the logical volume by its VOLSER 81, and the library 14, 15 having the updated logical volume is identified 82, and the deferred copy flag 83 is set.

If the copy is not made by the time the library migration algorithm selects the logical volume, it is migrated to a physical media volume 18 in step 130, and the library resets the cache flag of the library logical volume table 90.

In the typical circumstance, it is important that the redundancy of the library system is maintained by making the redundant copies. As an example, however, a service action may be conducted, and it is important to demonstrate the redundancy of the system by continuing to operate despite the service action. Thus, deferred copying provides a solution.

To make the redundant copies, a director, in step 139, determines whether any deferred copy logical volume is listed in the copy list 80 of FIG. 4. If so, the director 71–74, in step 140, selects one of the logical volumes from the copy list 80 of FIG. 4, and requests recall of the logical volume from the library 14, 15 storing the most recent copy, for copying to the other library. In step 141, the library controller 30 of the selected library 14, 15 receives the recall copy request.

In step 142, the library controller employs the library logical volume table 90 to determine whether the cache flag 92 is set for the requested logical volume. If the logical volume is still in cache 39, 40, and has not been migrated, the library controller, in step 144, sets the "recalled" flag 97 of the logical volume in the library logical volume table 90, thereby indicating that the logical volume will not be recalled with any other logical volumes.

If step 142 indicates that the cache flag 92 is not set, meaning that the requested logical volume is not in cache and has been migrated to a physical media volume, the library controller employs the library logical volume table 90 of FIG. 5, in step 155, to determine the physical media volume VOLSER 93 for the physical volume which contains the logical volume. Once the physical media volume has been determined, the library controller, in step 156, in accordance with the present invention, identifies all of the logical volumes to be copied (as indicated by the flag 96), in addition to the requested migrated logical volume, that are migrated and not recalled (as indicated by the absence of the flags 92 and 97) and stored as stacked logical volumes on the determined physical media volume 93 containing the requested migrated logical volume.

Then, in accordance with the present invention, the library controller 30, in step 157, selects up to a predetermined number "N" of the identified logical volumes, including the requested migrated logical volume, to be recalled. The predetermined number "N" is selected to be at the "knee" in the curve which relates the number of recalled logical volumes to the total time of the recalls, including the times to transport and mount the physical media volume. As an example, "N" may be selected to comprise a number between 10 and 20 logical volumes. In one embodiment, the library controller gives priority to the identified logical volumes most closely adjacent the requested migrated logical volume in selecting the up to "N" identified logical volumes. In this manner, the logical volumes best comprising a closely positioned sequence are recalled together at one time, saving substantial accessing time. As one example, logical volumes are selected if they are within a predetermined range of the requested logical volume, the library controller employing the location of the logical volume 94 on the physical media volume of the table 90 of FIG. 5.

Further in accordance with the present invention, in step 160, the library controller, again employing the location of the logical volume 94, optionally arranges the selected logical volumes in a sequence in accordance with the order that the selected logical volumes are written on the determined physical media volume. The library controller sets up a selection list 105 of FIG. 7 of the selected logical volumes arranged in accordance with the order that the selected logical volumes are written on the determined physical media volume. The example of the selection list comprises the logical volumes identified by VOLSER 106, identifies the location 107 of the logical volume on the physical media volume, and either may be physically arranged in sequence, or may employ a sequence number 108 to indicate the sequence, for each logical volume.

The library controller also, in step 164, employs the accessor 22 to transport and mount the determined physical media volume 18 to a data storage drive 35. As is known to those of skill in the art, the time required to transport and mount a physical media volume is extremely long as compared to the electronic speeds of the library controller. Thus, once the physical media volume has been mounted on the data storage drive, connector 165 leads to step 166 and the library controller recalls the selected logical volumes of the mounted physical media volume 18, via the data storage drive 35, to the cache storage 39, 40 in accordance with the selection list 105 of FIG. 7. The library controller also may set flag 97 in the library logical volume table 90 of FIG. 5 to indicate that the logical volume has been recalled.

Thus, the data transfer from the physical media volume is conducted in a highly efficient manner, and, in accordance with the invention, a larger number of logical volumes, up to "N" logical volumes, are transferred at one mounting of the physical media volume 18, rather than only a single logical volume. This reduces the physical mount activity to 1/N per logical volume.

Connector 168 of FIG. 9B relates to those logical volumes that had not been migrated but are to be copied without actually being recalled. The connector 168 leads to step 170 of FIG. 9C. Step 166 also leads to step 170.

In step 170, the library controller 30 provides a list 110 of FIG. 8 listing all of the recalled selected logical volumes by VOLSER 111. The list may provide the location in cache 112, or simply indicate that the logical volumes are in cache storage 39, 40, and providing a successful recall status 114. The list 110 may thus also list any logical volume that was not successfully recalled or is not in cache, the status 114 indicating the recall failure. The list is provided to at least the requesting director 71–74, so that the director may then copy the logical volumes directly out of cache. The list 110 is provided to all of the directors 71–74 that attempt to recall logical volumes, allowing them to update their lists to match the library and provide a redundant link that allows each director to determine which logical volumes are being recalled by other directors. Additionally, providing the list to all of the directors allows all directors coupled to the library to process the logical volumes that require copying in parallel, further maximizing copy efficiency.

The list 110 of step 170 is provided, in step 171, as an unsolicited "ATTENTION" message to each of the directors 71–74. As an unsolicited "ATTENTION" message, the message is provided instantly without waiting for an inquiry by the requesting director, and is provided to the other directors, which otherwise would have no basis to inquire.

In step 180, the director 71–74 receives the "ATTENTION" message, and, in step 181, determines whether the "ATTENTION" message is in response to a recall request by the director. If not, another director, such as the requesting director, will control or direct the copy process as illustrated by step 183. If the "ATTENTION" message is in response to a recall request of the director, the director, in step 185, conducts the copy process of accessing the recalled logical volumes and copying the logical volumes to the other library, the library providing the requested logical volumes. In step 187, the director updates all necessary tables, such as deleting the logical volume from the copy list 80 of FIG. 4 and updating the library's logical volume table 90 of FIG. 5 to reset the copying required flag 96 and recalled flag 97 off.

Thus, the present invention has substantially increased the efficiency of the recall and copying of migrated logical volumes requiring copying to cache storage 39, 40 by organizing an efficient grouping of the logical volumes of each single physical media volume having such migrated logical volumes, and recalling the entire grouping to cache storage with only a single mount process. As an example, a time to recall a single logical volume may comprise 120 seconds to access and mount a physical media volume and locate the logical volume, another 14 seconds to recall the logical volume, and another 10 seconds to copy the logical volume to the other library, for a total of 144 seconds. With the present invention, the time to access and mount the physical media volume is amortized over the number of logical volumes, reducing the physical mount activity to 1/N per logical volume. An analysis of the typical physical mount activity leads to a value of "N" of between 10 and 20 logical volumes as the most efficient number of logical volumes to be recalled at one time from a single physical media volume.

Referring to FIG. 9C, step 180, 185 and 187 may be conducted by one or more of the directors, or, preferably, all of the directors 71–74 respond to the recall list of step 170 received in step 180, by copying the recalled logical volumes in step 185 in parallel to the other library, updating the tables of step 187 to maintain the process. In this manner, the copying is conducted at a rapid pace.

Figure 10:
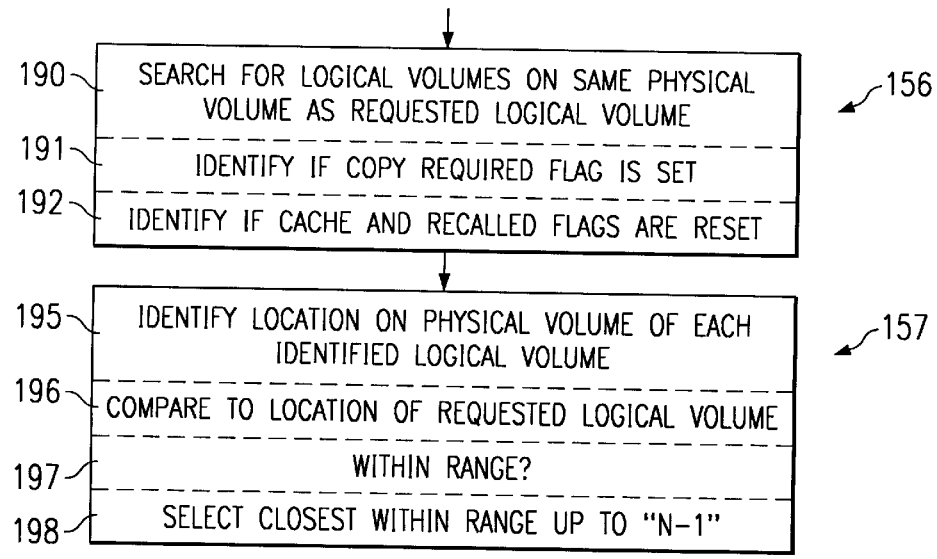
FIG. 10 is a flow chart depicting details of two of the steps of FIGS. 9A–C.

FIG. 10 illustrates an embodiment of detailed steps taken by the library controller 30 to implement steps 156 and 157 of FIGS. 9A–C. Specifically, the physical media volume containing the requested migrated logical volume has been determined, and the library controller, in detailed step 190 of step 156, searches table 90 of FIG. 5 for logical volumes stored as stacked logical volumes 91 on the determined physical media volume 93. In detailed step 191, the library controller identifies all of those logical volumes to be copied (as indicated by the presence of flag 96), in addition to the requested migrated logical volume, and, in step 192, those logical volumes that are migrated and not recalled already (as indicated by the absence of the flag 92 and the flag 97).

Then, the library controller 30, in step 157, selects up to "N" of the identified logical volumes, including the requested migrated logical volume, to be recalled. In detailed step 195, the library controller identifies the location 94 on the physical media volume of each identified logical volume, and, in step 196, compares the identified location of the logical volume to the location 94 of the requested logical volume. In step 197, the determination can be made whether the compared locations are within a predetermined range of each other. The predetermined range may comprise whether they are on the same tracks and/or within a predetermined access time of each other, such as 100 milliseconds. Then, in step 198, the library controller selects, from those logical volumes that are within range, up to "N–1" logical volumes that are the closest to the requested logical volume. Thus, step 157 thereby gives priority to the identified logical volumes most closely adjacent the requested migrated logical volume, in selecting the up to "N" identified logical volumes.

In this manner, the logical volumes best comprising a closely positioned sequence are recalled together at one time, saving substantial accessing time.

Figure 11:
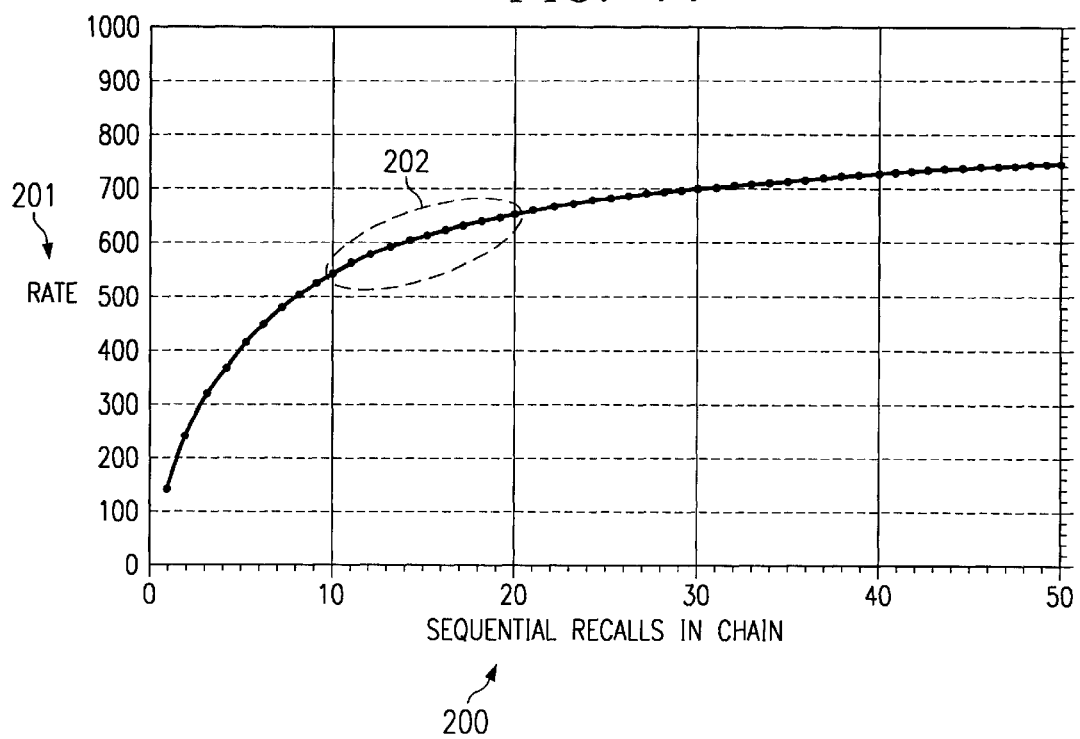
FIG. 11 is a diagram of an example of the number of recalled logical volumes with respect to the total time of the recalls.

Referring to FIG. 11, an example of the numbers of recalled logical volumes 200 is illustrated with respect to the rate 201 of the recalls. The predetermined number "N" is selected to be at the "knee" 202 in the curve, defined as still providing a significant benefit/cost relationship for each added recalled logical volume.

Those of skill in the art will understand that the ordering of the steps of FIGS. 9A–C and FIG. 10 may be altered and that the steps may be modified in detail while retaining the function of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for recalling logical volumes of data stored by an automated data storage library, said recall in response to a recall request; said library storing logical volumes, including logical volumes to be copied for redundant storage; said library having a plurality of storage shelves for storing physical media volumes, said physical media volumes each capable of storing a stacked plurality of said logical volumes; said library having at least one data storage drive for reading and/or writing said stacked logical volumes of said physical media volumes; said library having at least one accessor for transporting said physical media volumes amongst said storage shelves and said at least one data storage drive and mounting and demounting said physical media volumes at said at least one data storage drive; and said library having a cache storage for initially storing said logical volumes and storing said recalled logical volumes, said library migrating said logical volumes from said cache storage to said physical media volumes as stacked logical volumes; said recall request comprising a request for recalling one said logical volume to be copied; said method comprising the steps of:

responding to said recall request of said logical volume to be copied, which logical volume has been migrated to said physical media volumes, determining which said physical media volume contains said requested migrated logical volume;

identifying all said logical volumes to be copied, in addition to said requested migrated logical volume, that are migrated and stored as stacked logical volumes on said determined physical media volume containing said requested migrated logical volume;

selecting up to a predetermined number "N" of said identified logical volumes including said requested migrated logical volume;

employing said at least one accessor to transport and mount said determined physical media volume to said at least one data storage drive;

recalling said selected logical volumes of said mounted physical media volume, via said at least one data storage drive, to said cache storage in accordance with said selection; and providing, in response to said recall request, a recall list of said recalled selected logical volumes.

2. The method of claim 1, wherein said selecting-step additionally comprises giving priority to said identified logical volumes most closely adjacent to said requested migrated logical volume.

3. The method of claim 1, wherein said automated data storage library is coupled to a plurality of directors, one of said directors supplying said recall request, and wherein said step of providing a recall list comprises providing said recall list of said recalled selected logical volumes to all of said plurality of directors.

4. The method of claim 3, additionally comprising the step of, all said plurality of directors responding to said provided recall list, copying said recalled logical volumes-in parallel to said second automated data storage library.

5. The method of claim 1, wherein said library maintains a record of all logical volumes stored in said library, and said record identifying said physical media volume containing said logical volume, each record of said logical volumes to be copied having a flag identifying said logical volume as requiring copying, and wherein said identifying step additionally comprises identifying said logical volumes of said record both identified as contained in said physical media volume and as having said flag.

6. The method of claim 1, wherein said selecting step additionally comprises arranging a selection list of said selected logical volumes in a sequence in accordance with the order that said selected logical volumes are written on said determined physical media volume.

7. An automated data storage library for storing logical volumes, including logical volumes to be copied for redundant storage, said library coupled to a source of recall requests for recalling said logical volumes, said recall request comprising a request for recalling one said logical volume to be copied, said library comprising:

a plurality of storage shelves for storing physical media volumes, said physical media volumes each-capable of storing a stacked plurality of said logical volumes;

at least one data storage drive for reading and/or writing said stacked logical volumes of said physical media volumes;

at least one accessor for transporting said physical media volumes amongst said storage shelves and said at least one data storage drive and mounting and demounting said physical media volumes at said at least one data storage drive;

a cache storage for storing said logical volumes; and a library controller, said library controller performing the steps of:

migrating said logical volumes from said cache storage to said physical media volumes as stacked logical volumes;

responding to said recall request of said logical volume to be copied, which logical volume has been migrated to said physical media volumes, determining which said physical media volume contains said requested migrated logical volume;

identifying all said logical volumes to be copied, in addition to said requested migrated logical volume, that are migrated and stored as stacked logical volumes on said determined physical media volume containing said requested migrated logical volume;

selecting up to a predetermined number "N" of said identified logical volumes including said requested migrated logical volume;

employing said at least one accessor to transport and mount said determined physical media volume to said at least one data storage drive;

recalling said selected logical volumes of said mounted physical media volume, via said at least one data storage drive, to said cache storage in accordance with said selection; and providing, in response to said recall request, a recall list of said recalled selected logical volumes.

8. The automated data storage library of claim 7, wherein said library controller additionally gives priority to said identified logical volumes most closely adjacent to said requested migrated logical volume in selecting said up to "N" identified logical volumes.

9. The automated data storage library of claim 7, wherein said coupled source of recall requests comprises a plurality of directors, one of said directors supplying said recall request, and wherein said library controller provides said recall list of said recalled selected logical volumes to all of said plurality of directors.

10. The automated data storage library of claim 7, wherein said library controller additionally maintains a record of all logical volumes stored in said library, said record identifying said physical media volume containing said logical volume, each record of said logical volumes to be copied having a flag identifying said logical volume as requiring copying; and said library controller identifies said logical volumes to be copied by identifying those of said logical volumes of said record, both as contained in said physical media volume and as having said flag.

11. The automated data storage library of claim 7, wherein said library controller, in selecting said up to "N" identified logical volumes, additionally arranges a selection list of said selected logical volumes in a sequence in accordance with the order that said selected logical volumes are written on said determined physical media volume.

12. The automated data storage library of claim 7, wherein said library controller provides said recall list as an unsolicited "ATTENTION" message.

13. A data storage library system for redundantly storing and accessing logical volumes of data, said library system comprising:
   at least one director, said director providing recall requests, said recall request comprising a request for recalling one said logical volume to be copied for redundant storage; and
   at least two automated data storage libraries for redundantly storing said logical volumes, each said library coupled to said at least one director, each said library comprising:
      a plurality of storage shelves for storing physical media volumes, said physical media volumes each capable of storing a stacked plurality of said logical volumes;
      at least one data storage drive for reading and/or writing said stacked logical volumes of said physical media volumes;
      at least one accessor for transporting said physical media volumes amongst said storage shelves and said at least one data storage drive and mounting and demounting said physical media volumes at said at least one data storage drive;
      a cache storage for storing said logical volumes; and
      a library controller, said library controller:
         migrating said logical volumes from said cache storage to said physical media volumes as stacked logical volumes;
         responding to said director recall request of said logical volume to be copied, which logical volume has been migrated to said physical media volumes, determining which said physical media volume contains said requested migrated logical volume;
         identifying all said logical volumes to be copied, in addition to said requested migrated logical volume, that are migrated and stored as stacked logical volumes on said determined physical media volume containing said requested migrated logical volume;
         selecting up to a predetermined number "N" of said identified logical volumes including said requested migrated logical volume;
         employing said at least one accessor to transport and mount said determined physical media volume to said at least one data storage drive;
         recalling said selected logical volumes of said mounted physical media volume, via said at least one data storage drive, to said cache storage in accordance with said selection; and
         providing to said director, in response to said recall request, a recall list of said recalled selected logical volumes.

14. The data storage library system of claim 13, wherein said library controller of said automated data storage library additionally gives priority to said identified logical volumes most closely adjacent to said requested migrated logical volume in selecting said up to "N" identified logical volumes.

15. The data storage library system of claim 13, comprising a plurality of directors, one of said directors supplying said recall request, and wherein said library controller of said automated data storage library provides said recall list of said recalled selected logical volumes to all of said plurality of directors.

16. The data storage library system of claim 15, wherein all of said plurality of directors respond to said provided recall list, copying said recalled logical volumes in parallel to the other of said at least two automated data storage libraries.

17. The data storage library system of claim 13, wherein said library controller of said automated data storage library additionally maintains a record of all logical volumes stored in said library, said record identifying said physical media volume containing said logical volume, each record of said logical volumes to be copied having a flag identifying said logical volume as requiring copying; and said library controller identifies said logical volumes to be copied by identifying those of said logical volumes of said record, both as contained in said physical media volume and as having said flag.

18. The data storage library of claim 13, wherein said library controller of said automated data storage library, in selecting said up to "N" identified logical volumes, additionally arranges a selection list of said selected logical volumes in a sequence in accordance with the order that said selected logical volumes are written on said determined physical media volume.

19. A computer program product usable with at least one programmable computer processor, for recalling logical volumes of data stored by an automated data storage library, said recall in response to a recall request; said library storing logical volumes, including logical volumes to be copied for redundant storage; said library having a plurality of storage shelves for storing physical media volumes, said physical media volumes each capable of storing a stacked plurality of said logical volumes; said library having at least one data storage drive for reading and/or writing said stacked logical volumes of said physical media volumes; said library having at least one accessor for transporting said physical media volumes amongst said storage shelves and said at least one data storage drive and mounting and demounting said physical media volumes at said at least one data storage drive; and said library having a cache storage for initially storing said logical volumes and storing said recalled logical volumes, said library migrating said logical volumes from said cache storage to said physical media volumes as stacked logical volumes; said recall request comprising a request for recalling one said logical volume to be copied; comprising:
   computer readable program code which causes said at least one computer processor comprising a library controller of said automated data storage library to respond to said recall request of said logical volume to be copied, which logical volume has been migrated to said physical media volumes, determining which said physical media volume contains said requested migrated logical volume;

computer readable program code which causes said at least one computer processor to identify all said logical volumes to be copied, in addition to said requested migrated logical volume, that are migrated and stored as stacked logical volumes on said determined physical media volume containing said requested migrated logical volume;

computer readable program code which causes said at least one computer processor to select up to a predetermined number "N" of said identified logical volumes including said requested migrated logical volume;

computer readable program code which causes said at least one computer processor to employ said at least one accessor to transport and mount said determined physical media volume to said at least one data storage drive;

computer readable program code which causes said at least one computer processor to recall said selected logical volumes of said mounted physical media volume, via said at least one data storage drive, to said cache storage in accordance with said selection; and computer readable program code which causes said at least one computer processor to provide, in response to said recall request, a recall list of said recalled selected logical volumes.

20. The computer program product of claim 19, wherein said computer readable program code additionally causes said at least one computer processor to give priority to said identified logical volumes most closely adjacent to said requested migrated logical volume in selecting said up to "N" identified logical volumes.

21. The computer program product of claim 19, wherein said coupled source of recall requests comprises a plurality of directors, one of said directors supplying said recall request, and wherein said computer readable program code additionally causes said at least one computer processor to provide said recall list of said recalled selected logical volumes to all of said plurality of directors.

22. The computer program product of claim 19, wherein said computer readable program code additionally causes said at least one computer processor to maintain a record of all logical volumes stored in said library, said record identifying said physical media volume containing said logical volume, each record of said logical volumes to be copied having a flag identifying said logical volume as requiring copying; and said computer readable program code additionally causes said at least one computer processor to identify said logical volumes to be copied by identifying those of said logical volumes of said record, both as contained in said physical media volume and as having said flag.

23. The computer program product of claim 19, wherein said computer readable program code which causes said at least one computer processor to select up to "N" said identified logical volumes, additionally causes said processor to arrange a selection list of said selected logical volumes in a sequence in accordance with the order that said selected logical volumes are written on said determined physical media volume.

24. The computer program product of claim 19, wherein said computer readable program code which causes said at least one computer processor to provide said recall list, causes said processor to provide said recall list as an unsolicited "ATTENTION" message.

* * * * *